United States Patent [19]

Kolesnik et al.

[11] 4,292,345

[45] Sep. 29, 1981

[54] METHOD OF PROTECTING CARBON-CONTAINING COMPONENT PARTS OF METALLURGICAL UNITS FROM OXIDATION

[76] Inventors: Mikhail I. Kolesnik, ulitsa Posadochnaya, 6, kv. 12; Anatoly P. Egorov, ulitsa Portovaya, 9a, kv. 9; Anatoly A. Kuznetsov, ulitsa Istoricheskaya, 20, kv. 116; Anatoly P. Gobov, ulitsa Rekordnaya, 34, kv. 5; Jury M. Ryabukhin, ulitsa Pobedy, 95, kv. 49, all of Zaporozhie; Viktor A. Rudakov, ulitsa Bogdana Khmelnitskogo, 60, kv. 121; Gennady V. Pisarev, ulitsa 23 Partsiezda, 1, kv. 45, both of Kalush Ivano-Frankovskoi oblasti; Jury M. Zheleznov, prospekt Lenina, 234, kv. 27, Zaporozhie; Alexei V. Vasiliev, ulitsa Bogdana Khmelnitskogo, 66, kv. 57, Ivano-Frankovskaya oblast. Kalush, all of U.S.S.R.

[21] Appl. No.: 118,637

[22] Filed: Feb. 4, 1980

[51] Int. Cl.$^3$ .................. B05D 3/02; B05D 5/12; H01B 1/06
[52] U.S. Cl. .................. 427/113; 252/506; 252/507; 252/508; 427/314; 427/380; 427/387; 428/408; 204/290 R
[58] Field of Search .................. 204/290 R; 427/113, 427/314, 380, 387; 428/408; 252/506, 507, 508

[56] References Cited

U.S. PATENT DOCUMENTS

| | | | |
|---|---|---|---|
| 2,866,724 | 12/1958 | Alexander | 427/113 X |
| 3,029,167 | 4/1962 | Carlson et al. | 427/113 X |
| 3,164,489 | 1/1965 | Timper | 427/113 X |
| 3,348,929 | 10/1967 | Valtschev et al. | 427/113 X |
| 4,119,572 | 10/1978 | Fridman et al. | 427/113 X |

FOREIGN PATENT DOCUMENTS 387035 11/1973 U.S.S.R. .................. 427/113

*Primary Examiner*—Michael R. Lusignan
*Attorney, Agent, or Firm*—Steinberg & Raskin

[57] ABSTRACT

A method of protecting carbon-containing component parts of metallurgical units from oxidation comprises impregnating a component part with orthophosphoric acid to form a glassy mass in the pores of the component part when the latter is heated, drying the component part until the moisture is removed from the pores thereof, additionally impregnating the component part with an elemental organic compound comprising an element: Si, or Ti, or Al and capable of forming a phosphate, and heating the impregnated component part to the temperature at which phosphates are formed.

18 Claims, No Drawings

METHOD OF PROTECTING CARBON-CONTAINING COMPONENT PARTS OF METALLURGICAL UNITS FROM OXIDATION

BACKGROUND OF THE INVENTION

1. Field of the Invention

The present invention relates to methods of producing carbon-containing component parts, and more particularly, to methods of protecting carbon-containing component parts of metallurgical units from degradation by oxidation and may be used in ferrous and non-ferrous metallurgy.

The term "metallurgical units" as used herein and hereinafter refers to electrolytic cells for the electrolytic production of non-ferrous metals such as magnesium or alumunium, to electric melting furnaces such as ore melting furnaces for the production of titanium slags and to blast furnaces, and the term "carbon-containing component parts" refers to graphite, graphitized and carbon electrodes of electrolytic cells, electric melting furnaces as well as to carbon-containing lining blocks for blast furnaces.

2. Description of the Prior Art

It is well known that intensive oxidation of carbon-containing component parts of metallurgical units by the oxygen of the air at elevated operating temperatures of the order of hundreds of degrees C is the main factor determining the losses of the mass of said component parts and their deformation due to localized burning of a carbon-containing material.

For example, in electric arc melting furnaces, the thermooxidizing destruction of graphitized electrodes away from an arc zone is quantitatively comparable to the electroerosive destruction and air burning of the same electrodes within the electric arc zone.

The thermooxidizing destruction of the graphitized anode portions disposed above the melt in electrolytic cells adapted to produce magnesium is so intense that it is necessary to replace the anodes in the course of the campaign of the electrolytic cell. This proves that the problem of increasing the resistance of the carbon-containing component parts to oxidation is very important, since consumption of said component parts largely affects the economy of processes for the production of non-ferrous and ferrous metals in the above metallurgical units.

Preventing the carbon-containing component parts of the metallurgical units from being exposed to the oxygen of the air by sealing the working space and further evacuating it or filling it with inert gases is advisable only for small metallurgical units adapted for the production of exceptionally pure metals and alloys in small quantities.

Therefore, efforts in searching for ways and means of protecting the carbon-containing component parts of large metallurgical units against the thermooxidizing destruction are mainly directed to a decrease in the rate of diffusion of the oxygen of the air into depth layers of the carbon-containing material or to preventing the surface and surface layers of the carbon-containing component parts from being acted upon by oxygen.

The decrease in the rate of diffusion of oxygen in the depth layers of the carbon-containing material can be attained by the production of the carbon-containing component parts from high density graphite. However, reserves of such graphite are limited. The same object can be attained by the production of dense carbon-containing component parts having porosity of 10 to 15% by pressure shaping, such as compression or extrusion. However, application of such methods involves an increase in the cost of the dense carbon-containing component parts 1.3 to 1.5 times as compared to the cost of the carbon-containing component parts having a porosity of 23 to 25%. It is to be noted that the coefficient of thermal expansion of dense carbon-containing component parts is higher than that of high-porous carbon-containing component parts. Therefore, the dense component parts turn out to be less stable under sharp temperature drop occurring in the working space of the metallurgical unit and are liable to cracking and cleavage fractures.

These disadvantages can be overcome to a large extent when employing methods providing a protective coating on the carbon-containing component parts, as is disclosed in U.S. Pat. Nos.: 3,060,115; 3,236,753; and 3,303,119. In accordance with these patents, the upper portions of a carbon electrode are coated with a thick layer of cryolite or alumina to form a protective coating. As practice has shown, these methods when used in protecting electrodes of electrolytic cell for the production of magnesium also suffer from a number of disadvantages. In particular, air or an aggressive medium under high-temperature conditions diffuse through the protective coating, fill up the pores of the electrode and cause oxidation. The resulting carbon oxide and dioxide volatilize through the coating, the bond between the grains of carbon gets broken and they fall off under the protective coating. This leads to higher electrical resistance of the electrode, increases voltage, disturbs the normal course of the electrolytic process and couses an excessive consumption of electric power. In addition, the electrodes must be replaced from time to time, since their service life is considerably shorter than the operating period of the electrolytic cell. When replacing a waste electrode with a new one, the protective coating of the latter may be torn, which brings about rapid destruction of this new electrode.

Most widely spread methods of protecting carbon-containing electrodes are those, wherein the electrodes are impregnated with various phosphorus-containing compositions as is disclosed in U.S. Pat. No. 3,029,167.

Such method of protection used for the first time as early as 1929 in Germany by the firm I. G. Farbenindustri has been modified but slightly. According to German Pat. No. 580190, the above method comprises impregnating the electrode with orthophosphoric acid. The orthophosphoric acid fills up the pores throughout the whole volume of the electrode and, when heated under operating conditions, changes to pyrophosphoric and metaphosphoric acids, thickens and turns to a polymer. The polymer is a glassy mass intimately filling the pores of the electrode and protecting the electrode from oxidation. Service life of the electrodes treated as described above is 3 to 9 months and small mechanical damages practically do not make it shorter. Other characteristics which distinguish the method consists in easy fabrication of the electrodes and their comparatively low cost due to utilization of a cheap carbon-containing material having a porosity of 20 to 25%.

However, despite the obvious advantages, this method suffers from a serious drawback limiting the service life of the carbon-containing component part. In particular, at a temperature of 350° C. the metaphosphoric acid starts to intensively evolve phosphoric anhydride P₂O₅ which volatilizes. This phenomenon brings about a severe deterioration in the efficiency of carbon protection at a temperature of 400° C. and at the same time considerably limits the field of application of the method rendering it unsuitable for the protection of carbon-containing lining blocks of blast furnaces, electrodes of ore melting furnaces and other high-temperature metallurgical units.

SUMMARY OF THE INVENTION

The principal object of the present invention is to provide a method of protecting carbon-containing component parts of metallurgical units from oxidation, which method makes it possible to eliminate volatilization of modifications of orthophosphoric acid from the pores and thereby to increase the service life of the component parts.

Another important object of the invention is to provide a method of protecting carbon-containing component parts from oxidation, which makes it possible to widen the temperature range of utilization of the same component parts.

One more object of the invention is to reduce the consumption of a carbon-containing material while producing non-ferrous and ferrous metals.

Another object of the invention is to reduce the number of electrodes replaced in the course of the production process and thereby to cut down losses of time.

These and other objects of the present invention are attained by a method of protecting carbon-containing component parts of metallurgical units from oxidation comprising impregnating the component part with orthophosphoric acid to form a glassy mass in the pores of the component part when heating the latter according to the invention, the component part impregnated with the orthophosphoric acid is dried until the moisture is completely removed from the pores, then additionally impregnated with an organoelement compound based on Si, Ti or Al and capable of forming phosphates, and finally heated to the temperature at which phosphates are formed.

Here and hereafter used as "organoelement compound based on Si, Al, Ti" are polyorganosiloxanes, polymetaloorganosiloxanes, containing such metals as Al and Ti, and also monomeric compounds having the following formula:

$$(R_1-O)_n-E-(R_2)_m$$

where:
E is an element selected from the group consisting of Si, Ti, Al;
R₁ is a radical selected from the group consisting of alkyl, aryl, aralkyl;
R₂ is alkyl C₁-C₆;
n and m are quantative indices:
n is from 1 to 4;
m is from 0 to 3.

When the component part is heated after the additional empregnation, phosphate SiP₂O₇, or TiP₂O₇ or phosphate, AlPO₄, is formed in the pores thereof. The phosphate itself has no open pores and forms a protective layer in the pores of the carbon-containing component part, thereby preventing phosphoric acid from volatilization. This, in turn, allows the service life of the carbon-containing component parts be increased by 1.5 to 2 times and their utilization is possible at a temperature as high as 1500° C.

The additional impregnation of the component parts may be accomplished with a solution of silicon organic polymers in organic solvents. This modification of the method is preferable when protecting the carbon-containing component parts, such as electrodes of electrolytic cell for the production of magnesium, from the action of temperatures of up to 750° C.

Having been additionally impregnated with the solutions of silicon organic polymers, the component parts are heated to a temperature of 300° to 350° C. to cause formation of a dense layer of phosphates.

To additionally impregnate the component parts, use may be made of solutions of polyorganosiloxanes in organic solvents.

To additionally impregnate the component parts, use may be made of solutions of polyalumooranosiloxanes in organic solvents.

The component parts may be additionally impregnated with solutions of polytitanoorganosiloxanes in organic solvents.

When protecting the carbon-containing component parts exposed to the action of temperature higher than 750° C., it is preferable in such modification of the method, to have the component parts additionally impregnated with monomeric organoelement compounds having the following formula:

$$(R_1-O)_n-E-(R_2)_m$$

where:
E is an element selected from the group consisting of Si, Ti, Al;
R₁ is a radical selected from the group consisting of alkyl, aryl, arakyl;
R₂ is alkyl C₁-C₆, and quantitative indices range within the following limits:
n is from 1 to 4;
m is from 0 to 3.

To additionally impregnate the component parts, use may be made of a solution of tetraethoxysilane. This modification is preferable when protecting electrodes intended to be used in electric furnaces.

To protect electrodes of ore melting furnaces, it is expedient to use a modification of the method, wherein a solution of tetraethoxytitanium is used for the additional impregnation.

Having been additionally impregnated, the component part is preferably covered with a layer of an organoelement compound and then heated to the temperature at which phosphates are formed, which makes for an increase in mechanical strength of the coating and for its resistance to oxidation.

It is recommended that the surface of the component part be covered with a suspension consisting of the organoelement compound and a filler which is a finely divided powder of metals and/or their oxides. This contributes to an increase in mechanical strength of the coating and to its heat resistance.

The best results can be achieved when the size of particles of the organoelement compound suspension filler is 5 to 10 μm.

To prevent critical internal stresses and gaps in the protective mass filling the pores, it is expedient that after covering the surface of the component part with a layer of the organoelement compound, heating the component part to the temperature at which phosphates are formed be carried out by raising the temperature step-by-step.

When additionally impregnating the component part and covering the surface thereof with solutions of silicon organic polymers, it is necessary that the temperatures be first raised to 140° C., then to 240° C. and finally to 300° to 350° C., the rise of temperature being carried out with holding of the temperature at each of the steps for 2 to 4 hours.

When additionally impregnating the component part and covering the surface thereof with a solution of tetraethoxysilane, it is necessary that the temperature be first raised 100° to 150° C., then to 250° C. and finally to 300° to 400° C., the holding time at each of the steps ranging from 3 to 6 hours.

When additionally impregnating the component part and covering the surface thereof with a solution of triethoxyaluminum, it is necessary that the temperature be first raised to 100° to 150° C., then to 250° C. and finally to 350° to 600° C., the holding time at each of the steps ranging from 3 to 6 hours.

When additionally impregnating the component part and covering the surface thereof with a solution of tetraethoxytitanium, it is necessary that the temperature be first raised to 100° to 150° C., then to 250° C. and finally to 600° to 800° C. the holding time at each step ranging from 3 to 6 hours.

DETAILED DESCRIPTION OF THE EMBODIMENT

The invention will now be explained in greater detail with reference to particular examples of accomplishing the method of protecting carbon-containing component parts of metallurgical units from oxidation, according to the invention.

EXAMPLE 1

A machined, graphitized electrode of rectangular cross-section intended to serve as an anode in the electrolytic production of magnesium was installed in a vessel containing industrial orthophosphoric acid and impregnated with said acid at a temperature of 80° C. until 92 to 94% of the pores of the electrode were filled up.

After pouring the orthophosphoric acid out, the electrode was dried at a temperature of 180° C. until the moisture was removed from the pores. Thereafter, the above vessel was filled with a solution of an organoelement compound, in this case with a solution of polytitanophenyl siloxane resin in a mixture of toluene and butanol, and the electrode was additionally impregnated until a weight gain of not less than 18% per the portion being impregnated was obtained.

The additional impregnation was carried out by applying the solution of polytitanophenyl siloxane resin to the surface of the component part with a brush or roller.

Having been additionally impregnated the electrode was heated to a temperature of 350° C.

The prepared graphitized electrode was installed in the ceiling floor of an electrolytic cell for the production of magnesium. The service life of the electrode described in this Example amounted to 15 months, i.e. 1.5 times as high as the service life of an electrode impregnated with orthophosphoric acid only.

EXAMPLE 2

A machined, graphitized electrode of rectangular cross-section intended to serve as an anode in the electrolytic production of magnesium was installed in a vessel containing industrial orthophosphoric acid and impregnated with said acid at a temperature thereof amounting to 80° C. until 92 to 94% of the pores of the electrode were filled up. After pouring the orthophosphoric acid out, the electrode was dried. Thereafter, the above vessel was filled with a solution of an organoelement compound, in this case with a solution of polyalumophenylsiloxane resin in a mixture of toluene and butanol, and the electrode was additionally impregnated until a weight gain of not less than 18% per the portion being impregnated was obtained.

Having been additionally impregnated the electrode was heated to a temperature of 320° C.

The prepared graphitized electrode was installed in the ceiling floor of an electrolytic cell for the production of magnesium. The service life of the electrode described in this Example amounted to 14 months, i.e. 1.4 times as high as the service life of the electrode impregnated with orthophosphoric acid only.

EXAMPLE 3

A machined, graphitized electrode of rectangular cross-section intended to serve as an anode in the electrolytic production of magnesium was installed in a vessel containing industrial orthophosphoric acid and impregnated with said acid at a temperature thereof amounting to 80° C. until 92 to 94% of the pores of the electrode were filled up. After pouring the orthophosphoric acid out, the electrode was dried. Thereafter, the above vessel was filled with a solution of an organoelement compound, in this case with a solution of polymethylphenylsiloxane resin modified with polyesters in ethyl cellusolve, and the electrode was additionally impregnated until a weight gain of not less than 20% per the portion being impregnated was obtained.

Used as a modifier was polyethylene glycol adipate modified with 2-ethylhexyl alcohol.

The prepared graphitized electrode was installed in the ceiling floor of an electrolytic cell for the production of magnesium. The service life of the electrode described in this Example amounted to 13 months, i.e. 1.3 times as high as the service life of the electrode impregnated with orthophosphoric acid only.

EXAMPLE 4.

A 500 mm diameter graphitized electrode intended to be used in steel-melting electric furnaces was installed in a vessel containing industrial orthophosphoric acid and impregnated with said acid at a temperature thereof amounting to 80° C. until 92 to 94% of the pores of the electrode were filled up. After pouring the orthophosphoric acid out, the electrode was dried. Thereafter, the above vessel was filled with a solution of an organoelement compound, in this case with a solution of tetraethoxysilane, and the electrode was additionally impregnated until a weight gain of not less than 20% per the portion being impregnated was obtained.

Having been additionally impregnated, the electrode was heated to at temperature of 400° C. As a result of the above treatment, the pores of the electrode become filled with silicon phosphate.

The service life of such electrode is 10% higher than that of the electrode impregnated with orthophoric acid only.

EXAMPLE 5.

A 500 mm diameter graphitized electrode intended to be used in steel-melting electric furnaces was installed in a vessel containing industrial orthophosphoric acid and impregnated with said acid at a temperature thereof amounting to 80° C. until 92 to 94% of the pores of the electrode were filled up. After pouring the orthophosphoric acid out, the electrode was dried. Thereafter, the above, vessel was filled with a solution of an organoelement compound, in this case with a solution of triethoxyaluminium, and the electrode was additionally impregnated until a weight gain of not less than 22% per the portion being impregnated was obtained.

After the additional impregnation, the electrode was heated to a temperature of 500° C.

In the result of such treatment, the pores of the electrode become filled with aluminium phosphate.

The service life of such electrode is 12% higher than that of the electrode impregnated with industrial orthophosphoric acid only.

EXAMPLE 6

A 550 mm diameter graphitized electrode intended to be used in steel-melting electric furnaces was installed in a vessel containing industrial orthophosphoric acid and impregnated with said acid at a temperature thereof amounting to 80° C. until 92 to 94% of the pores of the electrode were filled up. After pouring the orthophosphoric acid out, the electrode was dried. Thereafter, the above vessel was filled with a solution of an organoelement compound, in this case with a solution of tetraethoxytitanium, and the electrode was additionally impregnated until a weight gain of not less than 22% per the portion being impregnated was obtained.

After the additional impregnation, the electrode was heated to a temperature of 800° C.

As a result of such treatment the pores of the electrode become filled with crystalline titanium pyrophosphate.

The service life of such electrode is 15% higher than that of the electrode impregnated with industrial orthophosphoric acid only.

EXAMPLE 7

A graphitized electrode intended to be used as an anode in the electrolytic production of magnesium was installed in a vessel containing orthophosphoric acid. The impregnation was carried out at a temperature of 80° C. until 92 to 94% of the pores of the electrode were filled up. After pouring the orthophosphoric acid out, the electrode was dried. Thereafter, the above vessel was filled with a monomeric organoelement compound, in this case with a solution of trimethylmethoxysilane, and the electrode was additionally impregnated until a weight gain of not less than 18% was obtained.

After the additional impregnation, the electrode was heated to a temperature of 400° C.

The above treatment resulted in the pores of the electrode being filled up with the silicon phosphate.

The thus prepared graphitized electrode was installed in the ceiling floor of an electrolytic cell for the production of magnesium. The service life of the electrode amounted to 14 months, i.e. 1.4 times as high as service life of an electrode impregnated with orthophosphoric acid only.

EXAMPLE 8

A graphitized electrode intended to be used as an anode in the electrolytic production of magnesium was installed in a vessel containing orthophosphoric acid. The impregnation was carried out at a temperature of 80° C. until 92% of the pores of the electrode were filled up. After pouring the orthophosphoric acid out, the electrode was dried. Thereafter, the above vessel was filled with a monomeric organoelement compound, in this case with a solution of trimethylphenyloxytitanium, and the electrode was additionally impregnated until a weight gain of not less than 20% was obtained.

After the additional impregnation, the electrode was heated to a temperature of 750° C.

The thus prepared graphitized electrode was installed in the ceiling floor of the electrolytic cell for the production of magnesium. The service life of the electrode amounted to 16.5 months, i.e. 1.65 times as high as the service life of an electrode impregnated with orthophosphoric acid only.

EXAMPLE 9.

A graphitized electrode intended to be used as an anode in the electrolytic production of magnesium was installed in a vessel containing orthophosphoric acid. The impregnation was carried out at a temperature of 80° C. until 94% of the pores of the electrode were filled up. After pouring the orthophosphoric acid out, the electrode was dried. Thereafter, the above vessel was filled with a monomeric organoelement compound, in this case with a solution of dimethylphenyloxyaluminium, and the electrode was additionally impregnated until a weight gain of not less than 20% was obtained.

After the additional impregnation, the electrode was heated to a temperature of 600° C.

The thus prepared graphitized electrode was installed in the ceiling floor of the electrolytic cell for the production of magnesium. The service life of the electrode amounted to 14 months, i.e. 1.4 times as high as the service life of an electrode impregnated with orthophosphoric acid only.

EXAMPLE 10.

A graphitized electrode intended to be used as an anode in the electrolytic production of magnesium was installed in a vessel containing orthophosphoric acid. The impregnation was carried out at a temperature of 80° C. until 94% of the pores of the electrode were filled up. After pouring the orthophosphoric acid out, the electrode was dried. Thereafter, the above vessel was filled with a monomeric organoelement compound, in this case with a solution of trimethyl 3,4-dimethylphenyloxysilane, and the electrode was additionally impregnated until a weight gain of not less than 18% was obtained.

After the additional impregnation, the electrode was heated to a temperature of 400° C.

The thus prepared graphitized electrode was installed in the ceiling floor of the electrolytic cell for the production of magnesium. The service life of the electrode amounted to 13 months, i.e. 1.3 times as high as the service life of an electrode impregnated with orthophosphoric acid only.

EXAMPLE 11.

A graphitized electrode intended to be used as an anode in the electrolytic production of magnesium was installed in a vessel comtaining orthophosphoric acid. The impregnation was carried out at a temperature of 80° C. until 92% of the pores of the electrode were filled up. After pouring the orthophosphoric acid out, the electrode was dried. Thereafter, the above vessel was filled with a monomeric organoelement compound, in this case with a solution of trimethyl 3,4-dimethylphenyloxititanium, and the electrode was additionally impregnated until a weight gain of not less than 20% was obtained.

After the additional impregnation, the electrode was heated to a temperature of 700° C.

The thus prepared graphitized electrode was installed in the ceiling floor of the electrolytic cell for the production of magnesium. The service life of the electrode amounted to 14.5 months, i.e. 1.45 times as high as that of an electrode impregnated with orthophosphoric acid only.

EXAMPLE 12.

A graphitized electrode intended to be used as an anode in the electrolytic production of magnesium was installed in a vessel containing orthophosphoric acid. The impregnation was carried out at a temperature of 80° C. until 93% of the pores of the electrode were filled up. After pouring the orthophosphoric acid out, the electrode was dried. Thereafter, the above vessel was filled with a monomeric organoelement compound, in this case with a solution of dihexydiethoxysilane, and the electrode was additionally impregnated until a weight gain of not less than 19% was obtained.

After the additional impregnation, the electrode was heated to a temperature of 350° C.

The thus prepared graphitized electrode was installed in the ceiling floor of the electrolytic cell for the production of magnesium. The service life of the electrode amounted to 13 months, i.e. 1.3 times as high as of an electrode impregnated with orthophosphoric acid only.

EXAMPLE 13

A machined, graphitized electrode of rectangular cross-section intended to be used as an anode in the electrolytic production of magnesium was installed in a vessel containing industrial orthophosphoric acid and impregnated with said orthophosphoric acid until 92 to 94% of the pores of the electrode were filled up. After pouring the orthophosphoric acid out, the electrode was dried at a temperature of 180° C. until the moisture was removed from the pores, whereupon the above vessel was filled with a solution of an organoelement compound, in this case with modified polymethylphenylsiloxane resin dissolved in toluene, and the electrode was additionally impregnated until a weight gain of not less than 22% per the portion being impregnated was obtained. Used as a modifier was glyptal resin. After the additional impregnation, the surface of the electrode was covered with a suspension containing polymethylphenylsiloxane resin modified with glyptal resin in toluene and an aluminium oxide $Al_2O_3$ (corundum) powder with the particle size of 5 $\mu$m., whereupon a sequential three-step heating of the electrode was effected: first to a temperature of 140° C., then to 240° C. and finally to 300° C. with holding of the temperature at each of the steps for 2 hours.

The prepared graphitized electrode was installed in the opening of the ceiling floor of an electrolytic cell for the production of magnesium. The service life of the electrode described in this Example amounted to 14.5 months, i.e. 1.45 times as high as that of the electrode impregnated with orthophosphoric acid.

EXAMPLE 14.

A machined, graphitized electrode of rectangular cross-section intended to be used as an anode in the electrolytic production of magnesium was installed in a vessel containing industrial orthophosphoric acid and impregnated with said acid at a temperature thereof amounting to 80° C. until 92 to 94% of the pores of the electrode were filled up. After pouring the orthophosphoric acid out, the electrode was dried until the moisture was removed from the pores. Thereafter, the above vessel was filled with a solution of an organoelement compound, in this case with a solution of polyalumophenylsiloxane resin in a mixture of toluene and butanol, and the electrode was additionally impregnated until a weight gain of not less than 22% per the portion being impregnated was obtained.

After the additional impregnation, the surface of the electrode was covered with a suspension consisting of polyalumophenylsiloxane resin in a mixture of toluene with butanol and aluminium oxide $Al_2O_3$ (corundum) powder with particle size of 6 m, and a sequential three-step heating of the electrode was effected: first to a temperature of 140° C., then to 240° C. and finally to 320° C. with holding the temperature at each of the steps for 3 hours.

The prepared graphitized electrode was installed in the opening of the ceiling floor of an electrolytic cell for the production of magnesium. The service life of the electrode described in this Example amounted to 15.5 months, i.e. 1.55 times as high as that of the electrode impregnated with orthophosphoric acid only.

EXAMPLE 15.

A machined, graphitized electrode of rectangular cross-section intended to be used as an anode in the electrolytic production of magnesium was installed in a vessel containing industrial orthophosphoric acid and impregnated with said acid at a temperature thereof amounting to 80° C. until 92 to 94% of the pores of the electrodes were filled up. After pouring the orthophosphoric acid out, the electrode was dried until the moisture was removed from the pores. Thereafter, the above vessel was filled with a solution of an organoelement compound, in this case with a solution of polytitanophenyl siloxane resin in a mixture of toluene with butanol, and the electrode was additionally impregnated until a weight gain of not less than 22% per the portion being impregnated was obtained.

After the additional impregnation, the surface of the electrode was covered with a suspension consisting of polytitanophenylsiloxane resin in a mixture of toluene with butanol and titanium oxide $TiO_2$ (rutile) powder with a particle size of 10 $\mu$m, and a three-step heating of the electrode was effected: first to a temperature of 140°, then to 240° C. and finally to 350° C. with holding of the temperature at each of the steps for 4 hours.

The prepared graphitized electrode was installed in the opening of the celling floor of the electrolytic cell for the production of magnesium. The service life of the electrode described in this Example amounted to 16 months, i.e. 1.6 times as high as that of the electrode impregnated with orthophosphoric acid.

EXAMPLE 16.

A machined, graphitized electrode of rectangular cross-section intended to be used as an anode in the electrolytic production of magnesium was installed in a vessel containing industrial orthophosphoric acid and impregnated with said acid at a temperature thereof amounting to 80° C. until 92 to 94% of the pores were filled up. After pouring the orthophosphoric acid out, the electrode was dried until the temperature was removed from the pores. Thereafter, the above vessel was filled with a solution of an organoelement compound, in this case with a solution of polyomethylphenylsiloxane resin modified with polyesters in ethyl cellusolve, and the electrode was additionally impregnated until a weight gain of not less than 22% per the portion being impregnated was obtained.

Used as a modifier was polyethylene glycol adipate modified with 2-ethylhexyl alcohol.

After the additional impregnation, the surface of the electrode was covered with a suspension consisting of tetraethoxysilane and a finely divided silicon oxide $SiO_2$ (silica) powder, and a sequential three-step heating of the electrode was effected: first to a temperature of 100° C., then to 250° C. and finally to 300° C. with holding of the temperature at each of the steps for 3 hours.

The service life of such electrode is 14.5 months, i.e. 1.45 times higher than that of the electrode impregnated with orthophosphoric acid only.

EXAMPLE 17

A machined graphitized electrode of rectangular cross-section intended to be used as an anode in the electrolytic production of magnesium was installed in a vessel containing industrial orthophosphoric acid and impregnated with said acid at a temperature thereof amounting to 80° C. until 92 to 94% of the pores were filled up. After pouring the orthophosphoric acid out, the electrode was dried until the moisture was removed from the pores. Thereafter, the above vessel was filled with a solution of an organoelement compound, in this case with a solution of polyalumophenylsiloxane resin in a mixture of toluene with butanol, and the electrode was additionally impregnated until a weight gain of not less than 22% per the portion being impregnated was obtained.

After the additional impregnation, the surface of the electrode was covered with a suspension consisting of triethoxylaluminium and a finely divided powder of aluminium oxide $Al_2O_3$ (corundum), and a sequential three-step heating of the electrode was effected: first to 100° C., then to 250° C. and finally to 350° C. with holding of the temperature at each of the steps for 3 hours.

The service life of such electrode amounted to 15 months, i.e. 1.5 times higher than that of the electrode impregnated with orthophosphoric acid only.

EXAMPLE 18.

A machined, graphitized electrode of rectangular cross-section intended to be used as an anode in the electrolytic production of magnesium was installed in a vessel containing industrial orthophosphoric acid and impregnated with said acid at a temperature thereof amounting to 80° C. until 92 to 94% of the pores were filled up. After pouring the orthophosphoric acid out, the electrode was dried until the moisture was removed from the pores. Thereafter, the above vessel was filled with a solution of an organoelement compound, in this case with a solution of polytitanophenylsiloxane resin modified with polyesters in an organic solvent (a mixture of butanol with toluene) and the electrode was additionally impregnated until a weight gain of not less than 22% per the portion being impregnated was obtained.

After the additional impregnation, the surface of the electrode was covered with a suspension consisting of tetraethoxytitanium and a finely divided powder of titanium oxide $TiO_2$ (rutile), and a sequential three-step heating of the electrode was effected: first to 100° C., then to 250° C. and finally to 600° C. with holding of the temperature at each of the steps for 3 hours.

The service life of such electrode is 17 months, i.e. 1.7 times higher than that of the electrode impregnated with orthophosphoric acid only.

EXAMPLE 19

A machined, graphitized electrode of rectangular cross-section intended to be used as an anode in the electrolytic production of magnesium was installed in a vessel containing industrial orthophosphoric acid.

The impregnation was carried out at a temperature of 80° C. until 92 to 95% of the pores of the electrode were filled up. After pouring the orthophosphoric acid out, the electrode was dried. Thereafter, the above pressurized vessel was filled with a solution of an organoelement compound, in this case with a solution of tetraethoxysilane, and the electrode was additionally impregnated until a weight gain of not less than 22% per the portion being impregnated was obtained.

After the additional impregnation, assembly of the electrode into a block and preparation of its surface for buses to be installed thereon, a portion of the block was covered with a solution of polymethylphenylsiloxane resin modified with polyesters in an organic solvent (ethyl cellusolve) and a filler in the form of a finely divided powder with the particle size of 10 $\mu$m.

Aluminium oxide $Al_2O_3$ (corundum) was used as the above filler.

Used as a modifier was polyethylene glycol adipate modified with 2-ethylhexyl alcohol.

To improve the mechanical strength of the coating of the electrode, a sequential three-step heating thereof was effected first to 140° C., then to 240° C. and finally to 300° C. with holding of the temperature at each of the steps for 4 hours.

The prepared graphitized electrode was installed in a ceiling floor of an electrolytic cell for the production of magnesium. The service life of the electrode described in this Example amounted to 16 months, i.e. 1.6 times higher than that of the electrode impregnated with orthophosphoric acid only.

EXAMPLE 20

A machined, graphitized electrode of rectangular cross-section intended to be used as an anode in the electrolytic production of magnesium was installed in a vessel containing industrial orthophosphoric acid.

The impregnation was carried out at a temperature of 80° C. until 92 to 94% of the pores of the electrode were filled up. After pouring the orthophosphoric acid out, the electrode was dried. Thereafter, the above pressurized vessel was filled with a solution of an organoelement compound, in this case with a solution of tetraethoxysilane, and the electrode was additionally impregnated until a weight gain of not less than 22% per the portion being impregnated was obtained.

After the additional impregnation, assembly of the electrode into a block and preparation of the surface thereof for buses to be installed thereon, a portion of the block was covered with a solution of polyphenyl siloxane resin modified with polybutylmethacrylate in an organic solvent (toluene) and a filler in the form of a finely divided powder with the particle size of 6 m. Aluminium oxide $Al_2O_3$ (corundum) was used as the above filler.

To improve the mechanical strength of the coating of the electrode, a sequential three-step heating thereof was effected: first to 140° C., then to 240° C. and finally to 350° C. with holding of the temperature at each of the steps for 2 hours.

The prepared graphitized electrode was installed in the ceiling floor of an electrolytic cell for the production of magnesium. The service life of the electrode described in this Example amounted to 16 months, i.e. 1.6 times higher than that of the electrode impregnated with orthophosphoric acid only.

EXAMPLE 21

A graphitized electrode of rectangular in cross-section intended to be used as an anode in the electrolytic production of magnesium was installed in a vessel containing industrial orthophosphoric acid and impregnated with said acid at a temperature thereof amounting to 80° C. until 92 to 94% of the pores were filled up. After pouring the orthophosphoric acid out, the electrode was dried whereupon the above vessel was filled with a solution of an organoelement compound, in this case with a solution of triethoxyaluminium, and the electrode was additionally impregnated until a weight gain of not less than 22% per the portion being impregnated was obtained.

After the additional impregnation, assembly of the electrodes into a block and further preparation of the surface thereof for buses to be installed thereon a portion of the block was covered with a suspension consisting of polyalumodimethylsiloxane resin in toluene and a filler in the form of a finely divided powder having the particle size of 10 μm. Silicon oxide $SiO_2$ (silica) was used as the above filler. To improve the mechanical strength of the coating of the electrode, a sequential three-step heating thereof was effected: first to a temperature of 140° C., then to 240° C. and finally to 300° C. with holding of the temperature at each of the steps for 4 hours.

The prepared graphitized electrode was installed in the ceiling floor of an electrolytic cell for the production of magnesium. The service life of the electrode described in this Example amounted to 15.5 months, i.e. 1.55 times higher than that of the electrode impregnated with orthophosphoric acid only.

EXAMPLE 22

A graphitized electrode of rectanglar cross-section intended to be used as an anode in the electrolytic production of magnesium was installed in a vessel containing industrial orthophosphoric acid and impregnated with said acid at a temperature thereof amounting to 80° C. until 92 to 94% of the pores were filled up. After pouring the orthophosphoric acid out, the electrode was dried, whereupon the above vessel was filled with a solution of an organo-element compound, in this case with a solution of triethoxyaluminium, and the elctrode was additionally impregnated until a weight gain of not less than 22% per the portion being impregnated was obtained.

After the additional impregnation, assembly of the elctrodes into a block and further preparation of the surface thereof for buses to be installed thereon, a portion of the block was covered with a suspension consisting of polyalumomethylphenylsiloxane resin in a mixture of toluene with butanol and a filler in the form of a finely divided powder having the particle size of 10 μm. Silicon oxide $SiO_2$ (silica) was used as the above filler.

To improve the mechanical strength of the coating of the electrode, a sequential three-step heating thereof was effected: first to a temperature of 140° C., then to 240° C. and finally to 320° C. with holding of the temperature at each of the steps for 2 hours.

The prepared graphitized electrode was installed in the ceiling floor of an electrolytic cell for the production of magnesium. The service life of the electrode described in this Example amounted to 15.5 months, i.e. 1.55 times higher than that of the electrode impregnated with orthophosphoric acid only.

EXAMPLE 23

A graphitized electrode of rectangular cross-section intended to be used as an anode in the electrolytic production of magnesium was installed in a vessel containing industrial orthophosphoric acid and impregnated with said acid at a temperature thereof amounting to 80° C. until 92 to 94% of the pores were filled up. After pouring the orthophosphoric acid out, the electrode was dried, whereupon the above vessel was filled with a solution of an organoelement compound, in this case with a solution of triethoxyaluminium, and the electrode was additionally impregnated until a weight gain of not less than 22% was obtained.

After the additional impregnation, assembly of the electrodes into a block and further preparation of the surface thereof for buses to be installed thereon, a portion of the block was covered with a suspension comprising polyalumomethylphenylsiloxane resin in a mixture of toluene with butanol and a filler in the form of a finely divided powder having the particle size of 10 μm. Silicon oxide $SiO_2$ (silica) was used as the above filler.

To improve the mechanical strength of the coating of the component parts, a sequential three-step heating thereof was effected: first to a temperature of 140° C., then to 240° C. and finally to 350° C. at a rate of 0.5° C. per minute and with holding of the temperature at each of the steps for 3 hours.

The prepared graphitized electrode was installed in the ceiling floor of an electrolytic cell for the production of magnesium. The service life of the electrode described in this Example amounted to 15 months, i.e. 1.5 times higher than that of the electrode impregnated with orthophosphoric acid only.

EXAMPLE 24

A machined, graphitized electrode of rectangular cross-section intended to be used as an anode in the electrolytic production of magnesium was installed in a vessel containing industrial orthophosphoric acid and impregnated with said acid at a temperature thereof amounting to 80° C. until 92 to 94% of the pores were filled up.

After pouring the orthophosphoric acid out, the electrode was dried, whereupon the above pressurized vessel was filled with a solution of an organoelement compound, in this case with a solution of tetraethoxytitanium, and the electrode was additionally impregnated until a weight gain of not less than 22% per the portion being impregnated was obtained.

After the additional impregnation, assembly of the electrodes into a block and further preparation of the surface thereof for buses to be installed thereon a portion of the block was covered with a suspension consisting of polytitanodimethylsiloxane resin in toluene and a filler in the form of a finely divided powder having the particle size of 5 μm. Titanium oxide $TiO_2$ (rutile) was used as the above filler.

To improve the mechanical strength of the coating of the electrodes a sequential three-step heating of the latter was effected: first to a temperature of 140° C., then to 240° C. and finally to 300° C. with holding of the temperature at each of the steps for 4 hours.

The prepared graphitized electrode was installed in the ceiling floor of an electrolytic cell for the production of magnesium. The service life of the electrode described in this Example amounted to 16 months, i.e. 1.6 times higher than that of the electrode impregnated with orthophosphoric acid only.

EXAMPLE 25

A machined, graphitized electrode of rectangular cross-section intended to be used as an anode in the electrolytic production of magnesium was installed in a vessel containing industrial orthophosphoric acid and impregnated with said acid at a temperature thereof amounting to 80° C. until 92 to 94% of the pores were filled up. After pouring the orthophosphoric acid out, the electrode was dried, whereupon the above pressurized vessel was filled with a solution of an organoelement compound, in this case with a solution of tetraethoxytitanium, and the electrode was additionally impregnated until a weight gain of not less than 22% per the portion being impregnated was obtained.

After the additional impregnation, assembly of the electrodes into a block and further preparation of the surface thereof for buses to be installed thereon, a portion of the block was covered with a suspension consisting of polytitanodimethylsiloxane resin in toluene and a filler in the form of a finely divided powder having the particle size of 6 μm. Titanium oxide $TiO_2$ (rutile) was used as the above filler.

To improve the mechanical strength of the coating of the electrodes a sequential three-step heating thereof was effected: first to a temperature of 140° C., then to 240° C. and finally to 320° C. with holding of the temperature at each of the steps for 3 hours.

The prepared graphitized electrode was installed in the ceiling floor of an electrolytic cell for the production of magnesium. The service life of the electrode described in this Example amounted to 16 months, i.e. 1.6 times higher than that of the electrode impregnated with orthophosphoric acid only.

EXAMPLE 26

A machined, graphitized electrode of rectangular in cross-section intended to be used as an anode in the electrolytic production of magnesium was installed in a vessel containing industrial orthophosphoric acid and impregnated with said acid at a temperature thereof amounting to 80° C. until 92 to 94% of the pores were filled up. After pouring the orthophosphoric acid out, the electrode was dried whereupon the above pressurized vessel was filled with a solution of an organoelement compound, in this case with a solution of tetraethoxytitanium, and the electrode was additionally impregnated until a weight gain of not less than 22% per the portion being impregnated was obtained.

After the additional impregnation, assembly of the electrodes into a block and further preparation of the surface thereof for buses to installed thereon, a portion of the block was covered with a suspension consisting of polytitanodimethylsiloxane resin in toluene and a filler in the form of a finely divided powder having the particle size of 10 μm.

Titanium oxide $TiO_2$ (rutile) was used as the above filler.

To improve the mechanical strength of the coating of the electrodes, a sequential three-step heating thereof was effected: first to a temperature of 140° C., then to 240° C. and finally to 350° C. with holding of the temperature at each of the steps for 2 hours.

The prepared graphitized electrode was installed in the ceiling floor of an electrolytic cell for the production of magnesium. The service life of the electrode described in this Example amounted to 16 months, i.e. 1.6 times as high as that of the electrode impregnated with orthophosphoric acid only.

EXAMPLE 27

A graphitized electrode intended to be used in ore melting furnaces was installed in a vessel containing industrial orthophosphoric acid and impregnated with said acid at a temperature thereof amounting to 80° C. until 92 to 94% of the pores of the electrode were filled up. After pouring the orthophosphoric acid out, the electrode was dried whereupon the above vessel was filled with a solution of an organoelement compound, in this case with a solution of tetraethoxysilane, and the electrode was additionally impregnated until a weight gain of not less than 22% per the portion being impregnated was obtained. After the additional impregnation, the electrode was machined so as to be properly secured in an electrode holder. Thereafter, the surface of the electrode was covered with a suspension consisting of a finely divided power of metallic titanium and of tetraethoxysilane, and a sequential three-step heating of the electrode was effected: first to a temperature of 150° C., then to 250° C. and finally to 400° C. with holding of the temperature at each of the steps for 5 hours.

The service life of such electrode is by 15% higher than that of the electrode which was not subjected to the impregnation.

EXAMPLE 28

A graphitized electrode intended to be used in ore melting furnaces was installed in a vessel containing industrial orthophosphoric acid and impregnated with said acid at a temperature thereof amounting to 80° C. until 92 to 94% of the pores were filled up. After pouring the orthophosphoric acid out, the electrode was dried whereupon the above vessel was filled with a solution of an organoelement compound, in this case with a solution of triethoxyaluminium and the electrode was additionally impregnated until a weight gain of not less than 22% per the portion being impregnated was obtained. After the additional impregnation, the electrode was machined so as to be properly secured in an electrode holder. Thereafter, the surface of the electrode was covered with a suspension consisting of triethoxyaluminium and a finely divided powder of metallic titanium, and a sequential three-step heating of the electrode was effected: first to a temperature of 150° C., then to 250° C. and finally to 600° C. with holding of the temperature at each of the steps for 5 hours.

The service life of such electrode is 15% higher than that of the electrode which was not subjected to the impregnation.

EXAMPLE 29

A graphitized electrode intended to be used in ore melting furnaces was installed in a vessel containing industrial orthophosphoric acid and impregnated with said acid at a temperature thereof amounting to 80° C. until 92 to 94% of the pores of the electrode were filled up. After pouring the orthophosphoric acid out, the electrode was dried whereupon the above vessel was filled with a solution of an organoelement compound, in this case with a solution of tetraethoxytitanium, and the electrode was additionally impregnated until a weight gain of not less than 22% per the portion being impregnated was obtained. After the additional impregnation, the electrode was machined so as to be properly secured in an electrode holder. Thereafter, the surface of the electrode was covered with a suspension consisting of tetraethoxytitanium and a finely divided powder of metallic titanium, and a sequential three-step heating of the electrode was effected: first to a temperature of 150° C., then to 250° C. and finally to 800° C. with holding of the temperature at each of the steps for 5 hours.

The service life of such electrode is 20% higher than that of the electrode which was not subjected to the impregnation.

EXAMPLE 30

600×600 mm carbon containing blocks intended to be used in making the lining of cases of electrolytic cells for the production of aluminium were installed in a vessel containing industrial orthophosphoric acid and impregnated with said acid at a temperature thereof amounting to 80° C. until 92 to 94% of the pores of the blocks were filled up.

After pouring the orthophosphoric acid out, the blocks were dried whereupon the above vessel was filled with a solution of an organoelement compound, in this case with a solution of tetraethoxysilane, and the blocks were additionally impregnated until a weight gain of not less than 22% per the portion being impregnated was obtained.

Thereafter, the block side facing the electrolyte was covered with a suspension consisting of tetraethoxysilane and a filler in the form of a finely divided powder having the particle size of 6 $\mu$m.

Aluminium oxide $Al_2O_3$ (corundum) was used as the above filler.

To improve the mechanical strength of the coating and to ensure silicon pyrophosphate formation in the block, a sequential three-step heating was effected: first to a temperature of 150° C., then to 250° C. and finally to 400° C. with holding of the temperature directly on the walls of the both at each of the steps for 6 hours.

The service life of the lining of the electrolytic cell case increased by 10%.

EXAMPLE 31

600×600 mm carbon containing blocks intended to be used in making the lining of cases of electrolytic cells for the production of aluminium were installed in a vessel containing industrial orthophosphoric acid and impregnated with said acid at a temperature thereof amounting to 80° C. until 92 to 94% of the pores of the articles were filled up.

After pouring the orthophosphoric acid out, the blocks were dried, whereupon the above vessel was filled with a solution of an organoelement compound, in this case with a solution of triethoxyaluminium, and the blocks were additionally impregnated until a weight gain of not less than 22% per the portion being impregnated was obtained.

Thereafter, the block side facing the electrolyte was covered with a suspension consisting of triethoxyaluminium and a filler in the form of a finely divided powder having the particle size of 6 $\mu$m. Aluminium oxide $Al_2O_3$ (corundum) was used as the above filler.

To improve the mechanical strength of the coating and to ensure aluminium phosphate formation in the block, a sequential three-step heating was effected: first to a temperature of 150° C., then to 250° C. and finally to 600° C. with holding of the temperature directly in the walls of the both at each of the steps for 6 hours.

The service life of the lining of the electrolyzing cell apparatus increased by 10%.

EXAMPLE 32

600×600 mm carbon containing blocks intended to be used in making the lining of cases of electrolytic cells for the production of aluminium were installed in a vessel containing industrial orthophosphoric acid and impregnated with said acid at a temperature thereof amounting to 80° C. until 92 to 94% of the pores of the blocks were filled up.

After pouring the orthophosphoric acid out, the blocks were dried whereupon the above vessel was filled with a solution of an organoelement compound, in this case with a solution of tetraethoxytitanium, and the blocks were additionally impregnated until a weight gain of not less than 22% per the portion being impregnated was obtained.

Thereafter, the block side facing the electrolyte was covered with a suspension consisting of tetraethoxytitanium and of a filler in the form of a finely divided powder having the particle size of 8 $\mu$m.

Aluminium oxide $Al_2O_3$ (corundum) was used as the above filler.

To improve the mechanical strength of the coating and to ensure titanium pyrophosphate formation in the block, a sequential three-step heating was effected: first to a temperature of 150° C., then to 250° C. and finally to 800° C. with holding of the temperature directly on the walls of the bath at each of the steps for 6 hours.

The service life of the lining of the case of the electrolytic cell intended for the production of aluminium increased by 10%.

EXAMPLE 33

A graphitized electrode intended to be used in steel melting furnaces was installed in a vessel containing industrial orthophosphoric acid and impregnated with said acid at a temperature thereof amounting to 80° C. until 92 to 94% of the pores were filled up.

After pouring the orthophosphoric acid out, the electrode was dried whereupon the above vessel was filled with a solution of an organoelement compound, in this case with a solution of tetraethoxysilane, and the electrode was additionally impregnated until a weight gain of not less than 22% per the portion being impregnated was obtained. After the additional impregnation, the electrode was machined so as to be properly secured in an electrode holder. Thereafter, the surface of the electrode was covered with a suspension consisting of tetroethoxysilane and of a finely divided aluminium powder, and a sequential three-step heating was effected: first to a temperature of 120° C., then to 250° C. and finally to 400° C. with holding of the temperature at each of the steps for 3 hours.

The service life of such an electrode is 15% higher than that of the electrode impregnated with orthophosphoric acid only.

EXAMPLE 34

A machined graphitized electrode of rectangular cross-section intended to be used as an anode in the electrolytic production of magnesium was installed in a vessel containing industrial orthophosphoric acid and impregnated with said acid at a temperature thereof amounting to 80° C. until 92 to 94% of the pores of the electrode were filled up. After pouring the orthophosphoric acid out, the electrode was dried until the moisture was removed from the pores thereof. Thereafter, the above vessel was filled with a solution of an organoelement compound, in this case with a solution of tetraethoxysilane, and the electrode was additionally impregnated until a weight gain of not less than 22% per the portion being impregnated was obtained.

After the additional impregnation, assembly of the bars into a block and preparation of its surface for buses to be installed thereon, the block was covered with a suspension consisting of tetraethoxysilane and a filler in the form of a finely divided powder having the particle size of 5 μm. Aluminium oxide $Al_2O_3$ (corundum) was used as the above filler.

To improve the mechanical strength of the coating of the component parts and to ensure the formation of silicon phosphate, a sequential three-step heating of the electrodes was effected: first to a temperature of 120° C. then to 250° C. and finally to 350° C. with holding of the temperature at each of the steps for 4 hours.

The prepared graphitized electrode was installed in the ceiling floor of an electrolytic cell for the production of magnesium. The service life of the electrode described in this Example amounted to 16 months, i.e. 1.6 times as high as that of the electrode impregnated with orthophosphoric acid only.

EXAMPLE 35

A machined, graphitized electrode of rectangular cross-section intended to be used as an anode in the electrolytic production of magnesium was installed in a vessel containing industrial orthophosphoric acid and impregnated with said acid at a temperature thereof amounting to 80° C. until 92 to 94% of the pores of the electrode were filled up. After pouring the orthophosphoric acid out, the article was dried until the moisture was removed from the pores thereof, whereupon the above vessel was filled with a solution of an organoelement compound, in this case with a solution of triethoxyaluminium, and an additional impregnation was carried out until a weight gain of not less than 22% per the portion being impregnated was obtained.

After the additional impregnation, assembly of the bars into a block and preparation of its surface for buses to be installed thereon, the block was covered with a suspension consisting of triethoxyaluminium and of a filler in the form of a finely divided powder having the a particle size of 6 μm. Silicon oxide $SiO_2$ (silica) was used as the above filler.

To improve the mechanical strength of the coating of the electrodes and to ensure the formation of aluminium phosphate, a sequential three-step heating of the articles was effected: first to a temperature of 120° C., then to 250° C. and finally to 500° C. with holding of the temperature at each of the steps for 4 hours.

The prepared graphitized electrode was installed in the ceiling floor of an electrolytic cell for the production of magnesium. The service life of the electrode described in this Example amounted to 16 months, i.e. 1.6 times higher than that of the electrode impregnated with orthophosphoric acid only.

EXAMPLE 36

A machined, graphitized electrode of rectangular cross-section intended to be used as an anode in the electrolytic production of magnesium was installed in a vessel containing industrial orthophosphoric acid and impregnated with said acid at a temperature thereof amounting to 80° C. until 92 to 94% of the pores of the electrode were filled up. After pouring the orthophosphoric acid out, the electrode was dried until the moisture was removed from the pores thereof, whereupon the above vessel was filled with a solution of an organoelement compound, in this case with a solution of tetraethoxytitanium, and an additional impregnation was carried out until a weight gain of not less than 22% per the portion being impregnated was obtained.

After the additional impregnation, assembly of the bars into a block and preparation of its surface for buses to be installed thereon, the block was covered with a suspension consisting of tetraethoxytitanium and of a filler in the form of a finely divided powder having the particle size of 6 μm. Titanium oxide $TiO_2$ (rutile) was used as the above filler.

To improve the mechanical strength of the coating and to ensure the formation of titanium phosphate, a sequential three-step heating of the electrodes was effected, first to a temperature of 120° C., then to 250° C. and finally to 650° C. with holding of the temperature at each of the steps for 4 hours.

The prepared graphitized electrode was installed in the ceiling floor of an electrolytic cell for the production of magnesium. The service life of the electrode described in this Example amounted to 17 months, i.e. 1.7 times higher than that of the electrode impregnated with orthophosphoric acid only.

It is to be understood that the particular examples of the invention described hereinabove are given for illustrative purposes only, and that various changes may be resorted to without departing from the scope of the claims below.

What is claimed is:

1. A method of producing carbon-containing component parts of metallurgical units which are protected against oxidation, comprising the steps of:
    (a) impregnating a porous carbon-containing component part with orthophosphoric acid to substantially fill the pores thereof with said orthophosphoric acid;
    (b) drying said component part until the moisture is completely removed from the pores of the carbon-containing material;
    (c) further impregnating the thus orthophosphoric acid-impregnated component part with an organoelement compound based on an element selected from the group consisting of Si, Ti, and Al, which organoelement compound is capable of reacting with orthophosphoric acid to form phosphates of said elements; and (d) heating the thus further impregnated component part to a temperature at which said organoelement compound reacts with orthophosphoric acid to form the corresponding phosphates, said phosphates being formed both in the pores and on the surface of the carbon-containing material.

2. The method of claim 1, wherein the further impregnation of the component parts is effected with solutions of silicon organic polymers in organic solvents.

3. The method of claim 2, wherein the component parts after being further impregnated with the solutions of silicon organic polymers are heated to a temperature of 300° to 350° C.

4. The method of claim 1, wherein the further impregnation of the component parts is effected with solutions of polyorganosiloxanes in organic solvents.

5. The method of claim 1, wherein the further impregnation of the component parts is effected with solutions of polyalumoorganosiloxanes in organic solvents.

6. The method of claim 1, wherein the further impregnation of the component parts is effected with solutions of polytitanoorganosiloxanes in organic solvents.

7. The method of claim 1, wherein the further impregnation of the component parts is effected with monomeric organoelement compounds having the following formula:

$$(R_1-O)_n-E-(R_2)_m$$

where:
E is an element selected from the group consisting of Si, Ti, Al;
$R_1$ is a radical selected from the group consisting of alkyl, aryl, aralkyl;
$R_2$ is alkyl $C_1$-$C_6$,
and quantitative indices range within the following limits:
n is from 1 to 4;
m is from 0 to 3.

8. The method of claim 7, wherein the further impregnation of the component parts is effected with a solution of tetraethoxysilane.

9. The method of claim 7, wherein the further impregnation of the component parts is effected with a solution of triethoxyaluminium.

10. The method of claim 7, wherein the further impregnation of the component parts is effected with a solution of tetraethoxytitanium.

11. The method of claim 1, wherein after further impregnating the component part, the surface thereof is covered with a layer of an elementoorganic compound, whereupon the component part is heated to the temperature at which phosphates are formed.

12. The method of claim 11, wherein the surface of the component part is covered with a suspension of the organoelement compound with a filler, which filler is a finely divided powder of metals and/or their oxides.

13. The method of claim 12, wherein the size of particles of the organoelement compound suspension filler is 5 to 10 μm.

14. The method of claim 11, wherein after covering the surface of the component part with a layer of the organoelement compound, heating the component part to the temperature at which phosphates are formed is carried out by step-wise raising of the temperature.

15. The method of claim 14, wherein in further impregnating the component part and covering the surfaces thereof with solutions of silicon organic polymers, the temperature is first raised to 140° C., then to 240° C. and finally to 300° to 350° C., the rise of temperature being carried out at a rate of 0.5° to 1.0° C. per minute and with a holding of the temperature at each of the steps of from 2 to 4 hours.

16. The method of claim 14, wherein in further impregnating the component part and covering the surface thereof with a solution of tetraethoxysilane, the temperature is first raised to 100 to 150° C., then to 250° at a rate of 0.5° to 1.0° C. per minute and finally to 300° to 400° C. at a rate of 1.5° to 3° C. per minute, the holding of the temperature at each of the steps ranging from 3 to 6 hours.

17. The method of claim 14, wherein in further impregnating the component part and covering the surface thereof with a solution of triethoxyaluminium, the temperature is first raised to 100° to 150° C., then to 250° C. at a rate of 0.5° to 1.0° C. per minute and finally to 350° to 600° C. at a rate of 1.5° to 3.0° C. per minute, the holding of the temperature at each of the steps ranging from 3 to 6 hours.

18. The method of claim 14, wherein in further impregnating the component part and covering the surface thereof with a solution of tetraethoxytitanium, the temperature is first raised to 100° to 150° C., then to 250° C. at a rate of 0.5° to 1.0° C. per minute and finally to 600° to 800° C. at a rate of 1.5° to 3° C. per minute, the holding of the temperature at each of the steps ranging from 3 to 6 hours.

* * * * *